United States Patent [19]

Kealey et al.

[11] Patent Number: 5,149,560

[45] Date of Patent: Sep. 22, 1992

[54] HEAT-RESISTANT CHOCOLATE AND METHOD OF MAKING SAME

[75] Inventors: Kirk S. Kealey, Long Valley; Nancy W. Quan, Budd Lake, both of N.J.

[73] Assignee: Mars, Inc., McLean, Va.

[21] Appl. No.: 674,652

[22] Filed: Mar. 25, 1991

[51] Int. Cl.⁵ ............................................... A23G 3/00
[52] U.S. Cl. ................................... 426/602; 426/660; 426/659; 426/613; 426/631; 426/306; 426/661
[58] Field of Search ............... 426/660, 631, 613, 601, 426/602, 659, 321, 331, 584, 585, 306

[56] References Cited

U.S. PATENT DOCUMENTS

| | | |
|---|---|---|
| 2,480,935 | 9/1949 | Kempf et al. .................... 426/660 |
| 2,487,931 | 11/1949 | Lataner ............................. 426/660 |
| 2,760,867 | 8/1956 | Kempf et al. .................... 426/660 |
| 2,863,772 | 12/1958 | Kempf .............................. 426/660 |
| 2,904,438 | 9/1959 | O'Rourke ........................ 426/660 |
| 3,218,174 | 11/1965 | Schubiger ........................ 426/660 |
| 4,045,583 | 8/1977 | Jeffery et al. .................... 426/660 |
| 4,081,559 | 3/1978 | Jeffery et al. .................... 426/660 |
| 4,081,568 | 3/1978 | Bracco ............................. 426/660 |
| 4,446,166 | 5/1984 | Giddey et al. .................... 426/660 |

FOREIGN PATENT DOCUMENTS 3-228647  9/1991  Japan .

*Primary Examiner*—Jeanette Hunter
*Attorney, Agent, or Firm*—Curtis, Morris & Safford

[57] ABSTRACT

This invention concerns a heat-resistant or thermally robust chocolate and method for making same. The inventive method provides a means of adding moisture to chocolate through use of lipid microstructure technology such as reverse micelle technology to form a stable water-in-oil emulsion, for example, hydrated lecithin. The stable water-in-oil emulsion is added to tempered chocolate during processing, and upon aging and stabilization, thermal robustness develops in the chocolate product. The heat-resistant chocolate of the instant invention is suitable for use in the same manner and for the same purposes for which ordinary chocolate is used. The invention provides a heat-resistant chocolate product having the desired taste, texture, mouth feel and other characteristics of ordinary chocolate.

12 Claims, No Drawings

HEAT-RESISTANT CHOCOLATE AND METHOD OF MAKING SAME

FIELD OF THE INVENTION

This invention relates to a heat-resistant or thermally robust chocolate and method for making same. More particularly, this invention relates to a chocolate and method of manufacturing the chocolate, which involves the addition of moisture to chocolate. This is done by initially creating a stable water-in-oil emulsion, for example, a hydrated lecithin, and then adding the emulsion to tempered chocolate. Upon aging and stabilization, thermal robustness develops in the chocolate product.

The heat-resistant or thermally robust chocolate of this invention is suitable for use in the same manner and for the same purposes as ordinary chocolate. For example, it can be roll formed molded into bars shell molded, co-sprayed or used to coat, or enrobe, other confectioneries or other food products.

BACKGROUND OF THE INVENTION

Ordinary chocolate is composed primarily of fats or fatty substances, such as cocoa butter, in which there are dispersed non-fat products such as cocoa components, sugars, proteins, etc. Therefore, since chocolate is primarily constituted by fat bodies, its melting temperature is relatively low. This means that ordinary chocolate is not particularly resistant to summer temperatures or the heat of tropical countries. Therefore, a need exists for a chocolate which is resistant to relatively high ambient temperatures.

A variety of means have been utilized in the past to attempt to remedy the relatively low melting temperature of ordinary chocolate. For example, fats of higher melting temperature can be selected for incorporation into the chocolate.

However, this procedure can result in chocolate having an undesirable taste and/or texture.

Methods which disrupt the continuous chocolate fatty phase, thereby minimizing the influence of the melting point of the fat on the overall softening of the chocolate mass, have also been used.

Such disruption of the continuous chocolate fatty phase has been effected in the past by various means, including direct water addition to the chocolate. Unfortunately, chocolate manufactured by direct water addition exhibits inferior product quality due to a coarse, gritty texture.

Disruption of the continuous chocolate fatty phase has also been effected by including in the composition a variety of particles, often solid particles. These processes unfortunately often result in an undesirable rough texture, or mouth feel, in the chocolate.

Swiss Patent No. 410,607 concerns a chocolate composition which contains hydrophilic substances such as dextrose, maltose, inverted sugar, etc. When chocolate is made with such a composition, it is exposed to a moist atmosphere whereby it absorbs a certain quantity of water. This causes a relative increase in the volume occupied by the hydrophilic substances and was said to improve heat resistance.

Additionally, Swiss Patent Nos. 399,891 and 489,211, are directed to a method of incorporating amorphous sugars into a chocolate composition during manufacture. The sugars cause the formation in the mass of a lattice structure which prevents collapse of the mass when the temperature exceeds the melting point of the fat bodies used in its preparation.

Swiss Patent No. 409,603 involves the direct incorporation of water into a chocolate composition during its manufacture. The water however, which is about 5% relative to the composition, causes a rapid thickening of the mass at temperatures where normally the mass is still a liquid. Unfortunately, since the mass is no longer liquid, it is not possible to use the composition to cast chocolate into molds. Thus the composition must be ground and the obtained powder must be pressed into shape by compression molding.

U.S. Pat. No. 2,760,867 involves the incorporation of water into chocolate by the addition of an emulsifier such as lecithin.

U.S. Pat. No. 4,081,559 concerns the addition to chocolate of an amount of sugar such that when the quantity of water required to obtain heat-resistant chocolate is added, there is formed an aqueous sugar solution in which at least one edible fat of the chocolate is emulsified.

Swiss Patent No. 519,858 involves incorporating fat bodies into a chocolate composition in an encapsulated state.

U.S. Pat. No. 4,446,116 is directed to a composition used in the preparation of a heat-resistant chocolate article. However, the water-in-fat emulsion prepared in accordance with the teachings of this patent results in a product containing at least 20% of the fat in solid form, and the water-in-fat mixture used in accordance with this patent does not remain in liquid form during processing. Presence of such solid bodies results in an undesired rough texture or mouth feel.

Thus, the provision of a suitable method of making a heat-resistant or thermally robust chocolate, without substantially negatively effecting the taste, texture, mouth feel, appearance or other important characteristics of the chocolate, would be a valuable addition to the art.

OBJECTS OF THE INVENTION

It is thus a primary object of the invention to provide a heat-resistant or thermally robust chocolate composition.

It is another object of this invention to provide a chocolate composition having the taste, texture and mouth feel of traditional chocolate, and which can be molded or used to enrobe other confectioneries or foodstuffs in the same manner as traditional chocolate.

It is a further and related object of this invention to provide a method for manufacturing a heat-resistant chocolate composition, which chocolate has the smooth texture and mouth feel of ordinary traditional chocolate.

It is still a further object of this invention to provide a chocolate composition which introduces no foreign substances to the composition of the chocolate.

It is also an object of this invention to provide a chocolate composition which can be manufactured by a method which is little or no more complicated than the traditional method of manufacturing chocolate.

These and other objects of the invention will be readily apparent from the foregoing description and claims.

SUMMARY OF THE INVENTION

In one aspect, the invention is in a method which comprises the formation of a stable water-in-oil emulsion, for example, hydrated lecithin. The emulsion is subsequently added to tempered chocolate. Upon aging and stabilization, cocoa butter present in the tempered chocolate crystallizes, and thermal robustness develops.

The invention utilizes lipid microstructure technology, such as reverse micelles, to form a stable water-in-oil emulsion. Reverse micelles refer to the spontaneous formation of water pools in a lipid, non-aqueous phase in the presence of a surfactant. A monolayer of surfactant molecules forms at the oil/water interface.

Reverse micelle technology has been used in the past in the petroleum, cosmetic and pharmaceutical industries. Specific industrial applications are known to include oil recovery, drug delivery systems, cosmetic moisturizers and anti-wear additives in lubrication fluids.

In one aspect of the invention, lecithin, an approved ingredient for use in chocolate, is used as the emulsifier/surfactant. The water-in-oil emulsion therefore comprises primarily water, lecithin and cocoa butter. The emulsion is then added to tempered chocolate.

More specifically, a mixture of hydrated lecithin, i.e., about 70 to 90% water and 10 to 30% fractionated lecithin, is prepared. The fractionated lecithin is approximately half cocoa butter and half lecithin. The lecithin is prepared according to known processes, for example, as taught in U.S. Pat. Nos. 4,425,276 and 4,452,743. The hydrated lecithin mixture is added to tempered chocolate to result in the amount of approximately 1.0 to 3.0%, preferably 1.8 to 1.975%, of the final composition. This mixture is maintained at approximately about 140° F., cooled to about 110° F. and added directly to tempered chocolate during the normal chocolate manufacturing process. The hydrated lecithin mixture can remain liquid at temperatures above about 105° F.

The water-in-oil emulsion may also be further stabilized to facilitate processing by the use of co-surfactants. Co-surfactants employed may include various emulsifiers other than lecithins and milk solids.

Other inventive aspects employ hydrated cocoa butter, and yet other embodiments employ hydrated milk fats to form the water-in-oil emulsion.

DESCRIPTION OF CERTAIN PREFERRED EMBODIMENTS OF THE INVENTION

The invention is directed to a heat-resistant chocolate composition and method for making same. The method comprises forming a water-in-oil emulsion, for example, a hydrated lecithin, by means of lipid microstructure technology such as reverse micelles. A reverse micelle is formed, in which water pools are spontaneously formed in a lipid, non-aqueous phase in the presence of a surfactant, such as lecithin. A monolayer of lecithin molecules forms at the oil/water interface. These emulsions are then added to tempered chocolate. Additionally, the emulsions can further be stabilized to facilitate processing by use of co-surfactants.

A wide range of different ingredients, including a variety of lecithins, may be used to form the desired emulsions, depending upon desired respective water holding capacities or dispersabilities.

Standard lecithin, one ingredient which may be used, is a complex mixture of surface-active agents called phospholipids. Over approximately 65% of lecithin is composed of different phospholipids while the remaining approximately 35% is soybean oil carrier. Standard lecithin disperses or absorbs about 20% water by weight at approximately 110° F. before the emulsion completely breaks down.

Lecithins which have been enzymatically or chemically modified may also be used. These lecithins generally have higher HLB values of about 6-10, and are oil soluble and water dispersable. Some of these lecithins can absorb over about 85% water by weight at approximately 110° F. and thus are very useful. When combined with water and oil, these lecithins form water-in-oil emulsions or a type of reverse micelle. After combining with water, these hydrated lecithins are added to tempered chocolate resulting in a better textured, thermally robust chocolate after aging about one to two days in ambient conditions. Sufficient hydrated lecithin is added to the chocolate to increase final moisture content by about 1.5% and to a maximum lecithin content of about 0.5% in the final chocolate product.

A modified lecithin now available selectively concentrates specific phospholipids by fractionation. Since the most important phospholipid for water dispersability is phosphatidylcholine (PC), a fractionated lecithin of elevated PC content is appropriate. For example, a brand of lecithin, Chonat 150 (source Nattermann Phospholipids, Inc.) may be used. This is composed of approximately 50% PC, small levels of other phospholipids and carrier oil.

In a preferred embodiment of the invention, a mixture of from about 70 to 90% water and from about 10 to 30% fractionated lecithin is prepared. The preferred fractionated lecithin used is approximately half cocoa butter and half lecithin. The lecithin is prepared according to known processes, for example, as taught in U.S. Pat. Nos. 4,425,276 and 4,452,743. The water/lecithin mixture is added to ordinary chocolate in the amount of from about 1.0 to 3.0% of the final composition. This mixture is maintained at approximately from above about 105° F. to 160° F. and is added directly to tempered chocolate during the normal chocolate manufacturing process. The hydrated lecithin mixture can remain liquid at temperatures above about 105° F.

In an especially preferred embodiment, the specific procedure for preparation of the heat-resistant chocolate of the invention is as follows:

1. A mixture of water and refined lecithin (described above which is approximately half cocoa butter and half lecithin) is prepared. The amount of water used is typically from about 70 to 90% and preferably from about 80 to 85%. The levels of lecithin used are in the range from about 10 to 30% and preferably from about 15 to 20%. The solution is manually stirred for about 2 minutes until the solution is uniform.

2. The "hydrated lecithin solution" is added to tempered chocolate. The hydrated lecithin is added in the amount of from about 1.0 to 3.0%, and preferably from about 1.8 to 1.975% of the final composition.

3. The hydrated lecithin and chocolate solution is mixed for about one minute at low speed in a Hobart mixer.

4. The resulting chocolate composition may be used in a traditional molding procedure and in a traditional molding line, while maintaining the temperature at around 85° to 95° F., preferably from about 89° to 90° F.

In another embodiment, the invention involves replacing the soybean oil carrier in lecithin with cocoa butter as the carrier oil.

In yet another embodiment, the invention involves the use of different fats in the formation of the reverse micelle. For example, hydrated cocoa butter may be used.

In this embodiment, a three-component system of water, cocoa butter and emulsifier is employed. A variety of emulsifiers, for example, enzymatically modified lecithins as well as fractionated lecithins may be used. However, few emulsifiers are completely miscible in cocoa butter and water resulting in phase separation of the solutions after centrifugation. To avoid this problem, protein may be added to the water to decrease phase separation. An effective protein source which stabilizes this transient lipid microstructure is sodium caseinate. The size of the resulting lipid microstructure is less than 1.0 microns in diameter.

One composition of the initial lipid microstructure solution is as follows:
water 30%
protein (sodium caseinate) 0.3%
cocoa butter 62.7%
lecithin 7.0%

A grade of standard lecithin having about 70% of phospholipids and a lower HLB value (about 2 as opposed to about 4 in standard lecithin) is found to be most effective in stabilizing the reverse micelle in this embodiment. When the above lipid microstructure solution is added to tempered chocolate, viscosity does not substantially increase. Adequate solution is added to chocolate to increase the final moisture content by about 1.5%.

Sodium caseinate, the major milk protein, is not permitted in milk chocolate as an added ingredient. Therefore, a dilute source of sodium caseinate is used, for example, non-fat dry milk (NFDM), which is a permitted ingredient in chocolate. A NFDM can be used as the protein source in the lipid microstructure according to the following formula:
water 44%
protein (NFDM) 0.3%
cocoa butter 48.7%
lecithin 7.0%

The addition of this solution to tempered milk chocolate results in a minimal increase in viscosity. The chocolate coating can be used in standard enrobing equipment and results in chocolate being heat-resistant after about 24 hours.

In still another embodiment, the invention involves the use of hydrated milk fat in the formation of the original lipid microstructure. The composition of the original microstructure is similar to dairy butter, i.e. approximately 80% milk fat, 18% water, 0.5% protein and about 0.1% phosphatides (lecithin). Dairy butter is a water and oil emulsion of varying droplet size since it is not homogenized. The addition of warm butter to tempered milk chocolate results in an enrobable chocolate coating that is heat stable after about 24 hours. The resulting chocolate has a pronounced butter flavor and softer texture due to the elevated milk fat.

In still another embodiment, the invention involves using heavy cream, which is slightly higher in moisture but which is not a stable water-in-oil emulsion. Heat stability can be achieved however in heavy cream chocolate.

In yet another embodiment, the invention involves the use of anhydrous milk fat (AMF) which is increasingly hydrated with water or water pools entrained by lipid microstructures to a moisture content of between about 20 and 45%. Hydrated AMF solutions are then added to chocolates.

The present invention is further described and illustrated in the following examples. It will be appreciated that these examples are provided solely for the purpose of illustrating the invention and not for purpose of limitation. It will further be appreciated that variations and modifications to the product and process can be made by the skilled person without departing from the spirit or scope of the invention as defined in the appended claims.

EXAMPLE I

A mixture of about 81% water and 19% fractionated lecithin is prepared. The fractionated lecithin is approximately half cocoa butter and half lecithin. The lecithin is prepared according to known processes, for example, as taught in U.S. Pat. Nos. 4,425,276 and 4,452,743. The water/lecithin mixture is added to ordinary chocolate in the amount of approximately 1.975% of the final composition. This mixture is maintained at approximately about 140° F. cooled to about 110° F. and added directly to tempered chocolate during the normal chocolate manufacturing process. The result is a heat-stable chocolate with the taste and texture substantially the same as ordinary chocolate.

The terms and expressions which have been employed are used as terms of description and not of limitation and there is no intention in the use of such terms and expressions of excluding any equivalent of the features shown and described or portions thereof, it being recognized that various modifications are possible within the scope of the invention.

We claim:

1. A method of preparing a heat-resistant chocolate which comprises combining tempered chocolate and a stable water-in-oil emulsion, in the form of a lipid microstructure, able, and in an amount effective, to form the heat-resistant chocolate.

2. The method as defined in claim 1, wherein the water-in-oil emulsion is comprised of water and fractionated lecithin.

3. The method as defined in claim 1, wherein the water-in-oil emulsion is about 80 to 90% water and about 10 to 20% fractionated lecithin and wherein said water-in-oil emulsion is added to the tempered chocolate in an amount such that the heat-resistant chocolate comprises from about 1.5 to about 1.975% water-in-oil emulsion.

4. The method as defined in claim 1, wherein the water-in-oil emulsion is 81% water and 19% fractionated lecithin and wherein said water-in-oil emulsion is added to tempered chocolate to form a heat-resistant chocolate, in an amount such that the heat-resistant chocolate comprises about 1.975% water-in-oil emulsion and wherein the water-in-oil emulsion remains in liquid form during processing.

5. A heat-resistant chocolate which comprises tempered chocolate to which is added, in an amount effective to render the tempered chocolate heat resistant, a hydrated lecithin composition wherein the hydrated lecithin composition comprises a stable water-in-oil emulsion, of water and fractionated lecithin, in the form of a lipid microstructure.

6. The heat-resistant chocolate as defined in claim 5, wherein the water-in-oil emulsion is about 80% water and about 10 to 20% fractionated lecithin and wherein said water-in-oil emulsion is added to the tempered chocolate to form the heat-resistant chocolate, in an amount such that the heat-resistant chocolate comprises from about 1.5 to 1.975% water-in-oil emulsion.

7. A method of preparing a heat-resistant chocolate which comprises combining tempered chocolate and a stable water-in-oil emulsion, in the form of a lipid microstructure, able, and in an amount effective, to form the heat-resistant chocolate, wherein said water-in-oil emulsion comprises water and hydrated milk fat.

8. A method of preparing a heat-resistant chocolate which comprises combining tempered chocolate and a stable water-in-oil emulsion, in the form of a lipid microstructure, able, and in an amount effective, to form the heat-resistant chocolate, wherein said water-in-oil emulsion comprises water and anhydrous milk fat.

9. A method of preparing a heat-resistant chocolate which comprises combining tempered chocolate and a stable water-in-oil emulsion, in the form of a lipid microstructure, able, and in an amount effective, to form the heat-resistant chocolate, wherein said water-in-oil emulsion comprises water and heavy cream.

10. A method of preparing a heat-resistant chocolate which comprises combining tempered chocolate and a stable water-in-oil emulsion, in the form of a lipid microstructure, able, and in an amount effective, to form the heat-resistant chocolate, wherein said water-in-oil emulsion comprises cocoa butter, water and non-fat dry milk.

11. The method as defined in claim 1, wherein the water-in-oil emulsion is a reverse micelle.

12. The method as defined claim 11, wherein the reverse micelle comprises water and fractionated lecithin.

* * * * *